United States Patent
Chang et al.

(10) Patent No.: US 11,922,044 B2
(45) Date of Patent: *Mar. 5, 2024

(54) DATA STORAGE DEVICE AND CONTROL METHOD FOR NON-VOLATILE MEMORY

(71) Applicant: Silicon Motion, Inc., Jhubei (TW)

(72) Inventors: Yu-Hao Chang, New Taipei (TW); Yu-Han Hsiao, Shetou Township, Changhua County (TW); Po-Sheng Chou, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 32 days.

This patent is subject to a terminal disclaimer.

(21) Appl. No.: 17/835,183

(22) Filed: Jun. 8, 2022

(65) Prior Publication Data

US 2023/0266906 A1  Aug. 24, 2023

(30) Foreign Application Priority Data

Feb. 18, 2022 (TW) .................................. 111105951

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC .... G06F 3/0647; G06F 3/0604; G06F 3/0679; G06F 3/0652
See application file for complete search history.

(56) References Cited

U.S. PATENT DOCUMENTS

| | | |
|---|---|---|
| 5,996,103 A | 11/1999 | Jahanghir |
| 8,527,544 B1 | 9/2013 | Colgrove |
| 8,621,139 B2 | 12/2013 | Chu |
| 9,213,629 B2 | 12/2015 | Yeh |
| 9,501,501 B2 | 11/2016 | Madhavarapu et al. |

(Continued)

FOREIGN PATENT DOCUMENTS

| | | |
|---|---|---|
| CN | 105190623 B | 3/2019 |
| TW | I351605 B | 11/2011 |

(Continued)

OTHER PUBLICATIONS

Notice of Allowance dated Aug. 8, 2023, issued in U.S. Appl. No. 17/835,206 (copy not provided).

(Continued)

*Primary Examiner* — Jason W Blust
(74) *Attorney, Agent, or Firm* — McClure, Qualey & Rodack, LLP (57) ABSTRACT

A solution for deteriorated non-volatile memory is shown. When a controller determines that raw data read from the non-volatile memory is undesirable data, the controller performs safety moving of valid data of an erasure unit that contains the raw data to safely move the valid data of the erasure unit, wherein the erasure unit is a high-risk block, and the raw data in the non-volatile memory is regarded as being in a deteriorated physical address. Prior to being moved in the safety moving, the raw data is changed so that it is different from the undesirable data. In an exemplary embodiment, the undesirable data is all-1's data or all-0's data.

18 Claims, 8 Drawing Sheets

(56) References Cited

U.S. PATENT DOCUMENTS

| | | |
|---|---|---|
| 10,073,640 B1 * | 9/2018 | Klein .................... G06F 3/0604 |
| 10,446,252 B2 | 10/2019 | Yang |
| 10,558,563 B2 | 2/2020 | Kanno |
| 10,691,530 B2 | 6/2020 | Kim |
| 11,175,850 B2 | 11/2021 | Klein |
| 11,334,480 B2 | 5/2022 | Lee et al. |
| 2007/0016756 A1 | 1/2007 | Hsieh |
| 2007/0283428 A1 | 12/2007 | Ma et al. |
| 2014/0006695 A1 | 1/2014 | Makuni |
| 2014/0136924 A1 | 5/2014 | Zeng et al. |
| 2014/0325115 A1 | 10/2014 | Ramsundar |
| 2018/0113761 A1 | 4/2018 | Ko et al. |
| 2018/0357142 A1 | 12/2018 | Wong |
| 2018/0373445 A1 | 12/2018 | Cheng |
| 2019/0108136 A1 | 4/2019 | Park |
| 2019/0129840 A1 | 5/2019 | Kanno |
| 2020/0042500 A1 * | 2/2020 | Li ....................... H03M 7/3057 |
| 2020/0081780 A1 | 3/2020 | Li |
| 2020/0089608 A1 | 3/2020 | Chou |
| 2020/0250084 A1 | 8/2020 | Stephens et al. |
| 2021/0034272 A1 * | 2/2021 | Markus ................. G06F 3/0679 |
| 2022/0197815 A1 | 6/2022 | Cariello |
| 2022/0291854 A1 | 9/2022 | Wilson |
| 2022/0326873 A1 | 10/2022 | Han |

FOREIGN PATENT DOCUMENTS

| | | |
|---|---|---|
| TW | I375962 B | 11/2012 |
| TW | 201419295 A | 5/2014 |
| TW | I443512 B | 7/2014 |
| TW | I650647 B | 2/2019 |
| TW | 201931123 A | 8/2019 |
| TW | I700586 B | 8/2020 |
| TW | 202101223 A | 1/2021 |
| WO | 2005/120835 A1 | 12/2005 |

OTHER PUBLICATIONS

Non-Final Office Action dated Nov. 22, 2023, issued in U.S. Appl. No. 17/835,198.

* cited by examiner

| Read_Data | | | |
|---|---|---|---|
| Addr | raw data (without being descrambled) | CH# | read data (after being descrambled) |
| Addrn | 1...1   204 | CH1 | 0 1 1 0....1   202 |

| Damage_TAB | |
|---|---|
| deteriorated logical address (LBA_damaged) | safe block physical address (PBA_invalid) |
| ... | ... |

DATA STORAGE DEVICE AND CONTROL METHOD FOR NON-VOLATILE MEMORY

CROSS REFERENCE TO RELATED APPLICATIONS

This application claims priority of Taiwan Patent Application No. 111105951, filed on Feb. 18, 2022, the entirety of which is incorporated by reference herein.

BACKGROUND OF THE INVENTION

Field of the Invention

The present invention is related to a solution for deterioration in a non-volatile memory.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Non-volatile memory usually has special storage characteristics. In this technical field, control technologies based on those special storage characteristics have been developed. For example, to manage the mapping of information in a non-volatile memory, the special storage characteristics of non-volatile memory should be taken into consideration.

BRIEF SUMMARY OF THE INVENTION

A solution for deteriorated non-volatile memory is shown.

A data storage device in accordance with an exemplary embodiment of the present invention includes a non-volatile memory and a controller coupled to the non-volatile memory. When determining that raw data read from the non-volatile memory is undesirable data, the controller performs safety moving of valid data of an erasure unit that contains the raw data to safely move valid data of the erasure unit, wherein the erasure unit is a high-risk block with at least one page of all-1's or all-0's data, and the raw data in the non-volatile memory is regarded as being in a deteriorated physical address. Prior to being moved in the safety moving, the raw data is changed so that it is different from the undesirable data.

In this manner, the safety moving of the high-risk block will not result in the repeatedly duplication of the undesirable data. The storage space of the non-volatile memory is protected from being wasted.

In an exemplary embodiment, the undesirable data is all-1's data or all-0's data.

In an exemplary embodiment, the controller comprises a scrambling and descrambling module, which performs data scrambling before writing data into the non-volatile memory, and performs data descrambling after reading data from the non-volatile memory. The controller operates the scrambling and descrambling module to descramble the raw data to obtain a read data, and performs error checking and correction on the read data. When the read data fails the error checking and correction, the controller determines whether the raw data without data descrambling is the undesirable data.

In an exemplary embodiment, the data storage device further has a random access memory that temporarily stores the read data. In the random access memory, the controller changes the read data to a specific data. The controller reads the specific data from the random access memory, operates the scrambling and descrambling module to scramble the specific data to a scrambled result that is different from the undesirable data, and moves the scrambled result, rather than the undesirable data, for safety moving.

In an exemplary embodiment, the controller accesses the non-volatile memory through a plurality of channels. The controller provides a plurality of registers correspond one-to-one with the channels. When determining that the raw data is the undesirable data, the controller programs a register corresponding to a channel reading the undesirable data to flag the channel as a flagged channel.

In an exemplary embodiment, the controller plans the random access memory to provide a first-in-first-out buffer to buffer physical addresses of the non-volatile memory that a host requests to read, wherein each physical address includes channel information. The controller checks the first-in-first-out buffer to get physical address candidates corresponding to the flagged channel. According to the physical address candidates, the controller reads the non-volatile memory to determine the deteriorated physical address of the raw data that is the undesirable data.

In an exemplary embodiment, according to each physical address candidate, the controller reads a spare information area of the non-volatile memory. When reading all-1's bits or all-0's bits from a spare information area, the controller determines that the corresponding physical address candidate is the deteriorated physical address.

In an exemplary embodiment, the controller reads the non-volatile memory according to each physical address candidate without reading a user data area indicated by each physical address candidate.

In an exemplary embodiment, the controller builds a deterioration data structure in the random access memory, and uses an item in the deterioration data structure to store the physical address candidates as well as a temporary storage address in which the random access memory stores the read data. The controller obtains the physical address candidates from the item in the deterioration data structure to read the non-volatile memory for determination of the deteriorated physical address. After determining the deteriorated physical address, the controller obtains the temporary storage address from the item in the deterioration data structure. In the temporary storage address of the random access memory, the controller changes the read data to the specific data.

In an exemplary embodiment, when the specific data is read, the controller determines that deterioration has occurred.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics. The host side issues read and write requests to the flash memory with logical addresses (for example, logical block address LBA or a global host page number GHP, etc.). The logical addresses need to be mapped to the physical addresses of physical space of the flash memory. Flash memory control requires dynamic management of mapping information.

The physical space of flash memory is divided into a plurality of blocks for use. A block is an erasure unit. The content of the same block needs to be erased together, so that the used space is released block by block. Each block includes a plurality of pages, e.g., numbered from page 0 to page 255. Each page includes a plurality of sectors, for example, 32 sectors. In an exemplary embodiment, each sector stores 512B of user data. Each page can provide a 16 KB user data area and is attached with a 2 KB spare information area. The spare information area stores mapping information, etc., as metadata.

In order to improve the data throughput, a multi-channel access technology is used in flash memory control. Multiple channels are used for parallel access to the flash memory. A flash memory may consist of a plurality of dies. The dies may be divided into groups. The different groups of dies correspond to the different channels. Dies of the same group are accessed through the shared channel in an interleaved way. For example, chip enable signals (CE#, where # represents a number) are control signals for accessing the dies sharing the same channel in an interleaved way. According to an exemplary embodiment, in every parallel accessing, the different channels each access one page. The pages accessed in parallel through the multiple channels form a super page, and their associated blocks are called a super block. According to the multi-channel access technology, the storage space of a super block may be sequentially accessed from the lower numbered super page to the higher numbered super page.

In particular, a flash memory is not suitable for storage of all-0's or all'1s data. The all-0's or all'1s data may damage the storage capability of a flash memory. In general design, the flash memory is equipped with a scrambler (or randomizer), which changes the all-0's or all' is data into a scrambled data which contains both 0 and 1 bits rather than all-0's or all-1's bits. This guarantees that the data actually programmed into the flash memory is not all-0's or all-1's data. The scrambler seed of each page may be stored in the spare information area as the metadata of the corresponding page. However, even with a scrambler, physical changes may happen and result in all-0's or all-1's data. In order to cope with such data deterioration in flash memory, solutions are proposed here.

Figure 1:
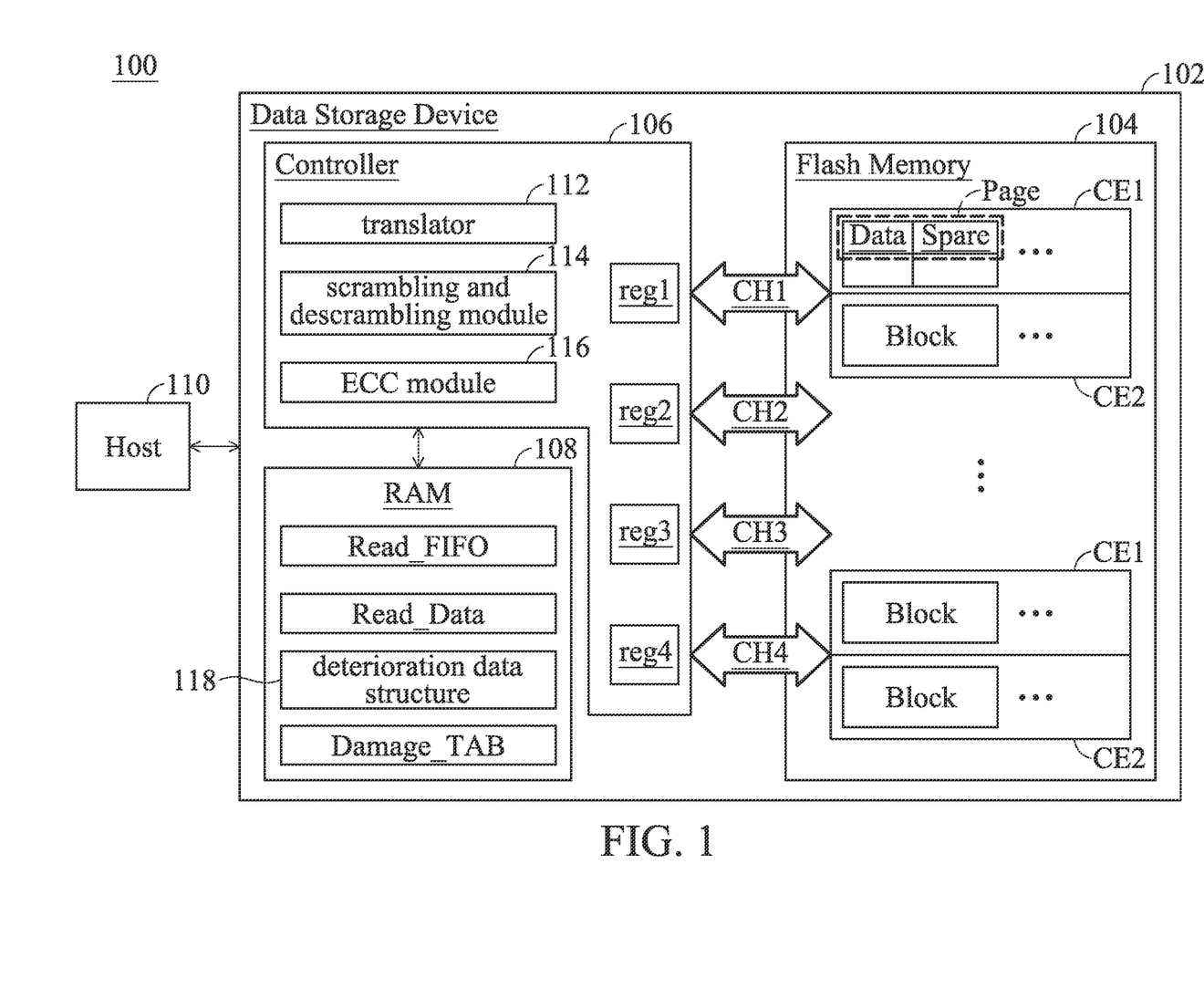
FIG. 1 depicts a data storage system 100 in accordance with an exemplary embodiment of the present invention.

FIG. 1 depicts a data storage system 100 in accordance with an exemplary embodiment of the present invention. A data storage device 102 used in the data storage system 100 includes a flash memory 104, a controller 106 and a random access memory 108. A host 110 is coupled to the data storage device 102. Through the controller 106, the host 110 accesses the flash memory 104 that is coupled to the controller 106. The controller 106 is further coupled to the random access memory 108. The controller 106 uses the random access memory 108 to store the temporary information required during operations. The random access memory 108 may be a dynamic random access memory (DRAM), or a static random access memory (SRAM). In another exemplary embodiment, the controller 106 may have a built-in storage space (e.g., a TSB). The controller 106 may also use the built-in TSB to store the temporary information required during operations. A computing structure with a RAM or with a built-in TSB are both within the scope of protection of the present invention.

The controller 106 implements the parallel access to the flash memory 104 through the multiple channels CH1 to CH4. Each channel is shared by two dies which are controlled by two chip enable signals CE1 and CE2. The two dies that share the same channel are also marked as CE1 and CE2. Each die provides a plurality of blocks for data storage. Each block is further divided into a plurality of pages. Each page includes a user data storage area (Data), and a spare information area (Spare).

The controller 106 is a specially designed processor that provides a variety of functional modules (implemented by computing hardware with the associated firmware design), including: a translator 112, a scrambling and descrambling module 114, an error checking and correction module 116, and so on. Each read/write request issued by the host 110 specifies the read/write of the flash memory 104 with a logical address LBA. The following discusses how the controller 106 handles the read and write requests that the host 110 issues to the flash memory 104.

This paragraph discusses write operations. Through the translator 112, a physical address PBA of the flash memory 104 is assigned to a logical address LBA of the write data. The error checking and correction module 116 performs error checking and correction encoding (e.g., ECC encoding) on the write data. The error checking and correction code may be a part of the metadata. Prior to being programmed into the flash memory 104 according to the translated physical address PBA, the write data, mapping information, error checking and correction code, and scrambling seed have to be scrambled by the scrambling procedure provided by the scrambling and descrambling module 114. Thus, in each page, the user data storage area Data and the spare information area Spare store scrambled contents rather than storing the undesirable all-1's or all-0's data.

Read operations are discussed below. The translator 112 translates the logical address LBA that the host 110 requests to read into a physical address PBA of the flash memory 104. The translation from LBA to PBA needs to load a mapping table from the flash memory 104 to the random access memory 108 and query the mapping table on the random access memory 108. The controller 106 plans the random access memory 108 to provide a first-in-first-out buffer (FIFO buffer) Read_FIFO to list the physical addresses PBAs (translation result) that the host 110 requests to read. Each physical address PBA listed in the FIFO buffer Read_FIFO may be represented by a channel number CH#, a chip enable signal number CE#, a block number Blk#, and a page number Page#. According to the physical addresses PBAs listed in the FIFO buffer Read_FIFO, the controller 106 reads raw data from the flash memory 104 and temporarily stores them in a read buffer Read_Data provided on the random access memory 108. The raw data is descrambled by the scrambling and descrambling module 114, and then is also temporarily stored in the read buffer Read_Data for error checking and correction by the error checking and correction module 116. In addition to performing error checking and correction on the descrambled data, the error checking and correction module 116 do more procedures on the checking and correction failed data (e.g., the ECC failed data). When the read data has errors but fails in the error correction, the error checking and correction module 116 may check whether the raw data without the descrambling is the undesirable all-1's or all-0's data, to determine whether deterioration (deteriorated to all-1's or all-0's data) happens on the flash memory 104.

Although the error checking and correction module 116 could determine the address of all-1's or all-0's data, the error checking and correction module 116, in another embodiment, may only know the channel number CH# of deterioration rather than the complete information about the physical address PBA of the deterioration. In an exemplary embodiment, the four channels CH1 to CH4 may correspond one-to-one with the four registers reg1 to reg4. When all-1's or all-0's data is read from one channel, the corresponding register is flagged to mark the channel happens the deterioration. In response to the flagged channel, the controller 106 starts a procedure to cure the deterioration. The controller 106 may check the FIFO buffer Read_FIFO to get all physical addresses related to the flagged channel. The obtained physical addresses are named the physical address candidates. The controller 106 needs to determine which one of the physical address candidates really happens the deterioration. Different from moving a block due to failed error checking and correction, this present invention deals with the all-1's or all-0's deterioration on a flash memory in a special way.

A block moving procedure initiated in response to an error checking and correction failure is called a safety moving. The general safety moving is to copy the content of a high-risk block that happens the error checking and correction failure to a safe block of the flash memory 104 (e.g., a spare block), to preserve the other healthy pages. In an exemplary embodiment, only the valid data in the high-risk block is moved. The high-risk block may be marked as damaged and no longer used. However, the general safety moving includes copying of the all-1's or all-0's data. The all-1's or all-0's data copied to the safety block will initiate the safety moving procedure again. The undesirable all-1's or all-0's data will be repeatedly duplicated throughout the flash memory 104. More and more blocks in the flash memory 104 are gradually marked as damaged, and the all storage card will be locked.

In an exemplary embodiment of the present invention, prior to being moved to the safe block, the raw data that has deteriorated to the undesirable all-1's or all-0's data is changed to be different from the undesirable all-1's or all-0's data. In this manner, the undesirable all-1's or all-0's data is not duplicated to the other blocks. In an exemplary embodiment, the deteriorated page is changed to a scrambled result of a specific data (e.g., a scrambled result of 0x55 or 0xAA). In the future, when a descrambled read page is the specific data, it is determined that this page has deteriorated. The host 110 is informed that the requested data is unreliable data.

In an exemplary embodiment, an additional deterioration table Damage_TAB is required, which lists every deteriorated logical address LBA_damaged for future recognition. If the logical address that the host 110 requests to read is listed in in the deterioration table Damage_TAB as a deteriorated logical address LBA_damaged, it means that there is no reliable data can be read from the flash memory 104 to answer the host 110.

In an exemplary embodiment, a high-risk block that contains a deteriorated page is moved to a safe block, and the block number of the safe block is also recorded in the deterioration table Damage_TAB. When the controller 106 is free, the controller 106 can perform garbage collection based on the block numbers Blk# recorded in the deterioration table Damage_TAB. The controller 106 regards the safe block as a source block for garbage collection, and collects valid data from safe block into a destination block. In particular, during the garbage collection, a page in the safe block and mapped to a deteriorated logical address LBA_damaged listed in the deterioration table Damage_TAB is regarded as an invalid page (no matter it has been changed to the specific data or not), and is not collected into the destination block. The problem due to the duplication of the undesirable all-1's or all-0's data is solved. The storage space utilization of the flash memory 104 is improved.

In another exemplary embodiment wherein the deterioration table Damage_TAB is updated to record the deteriorated logical addressees LBA_damaged, the deteriorated pages are directly invalidated without being moved from the high-risk block to the safe block during the safety moving. The undesirable data is clearly marked in the deterioration table Damage_TAB. The meaningless duplication of the undesirable all-1's or all-0's data is prevented. The storage space utilization of the flash memory 104 is improved.

This paragraph further details how to determine a deteriorated page. The controller 106 may check the registers reg1~reg4 when the host 110 has no request to the data storage device 102. In another exemplary embodiment, the controller 106 may check the registers reg1~reg4 in regular time intervals. If any flag about the channel data deterioration is asserted, the controller 106 queries the FIFO buffer Read_FIFO according to the channel number CH # corresponding to the flagged channel, and thereby obtains physical addresses PBAs recorded in the FIFO buffer Read_FIFO and corresponding to the channel number CH #. The controller 106 may record the obtained physical addresses PBAs in the random access memory in a deterioration data structure. The physical addresses PBAs recorded in the deterioration data structure 118 are regarded as physical addresses candidates to be checked. According to the physical addresses candidates presented in the deterioration record data structure 118, the controller 106 reads the flash memory 104 to determine which physical address candidate really happens the deterioration. In an exemplary embodiment, a spare information area Spare of a page indicated by each physical address candidate is checked, but the checking of a user data area Data of a page indicated by each physical address candidate is omitted. If the spare information area Spare is all-1's or all-0's content, it is determined that the page is deteriorated. Compared with reading the user data area Data (e.g., 16 KB) to determine the deteriorated page, simply reading the spare information area Spare (e.g., 2B) to determine the deteriorated page is higher in performance.

Figure 2A:
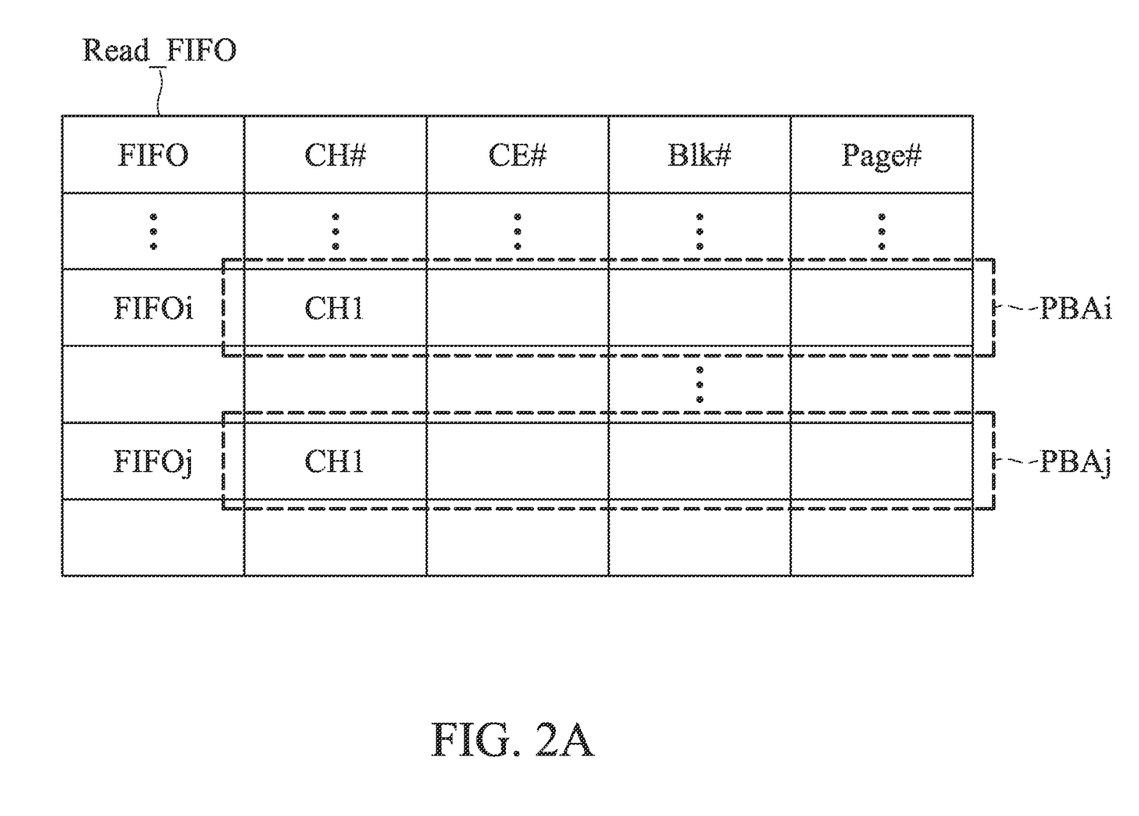
FIG. 2A illustrates the storage structure in the FIFIO buffer Read_FIFO in accordance with an exemplary embodiment of the present invention.
Figure 2B:
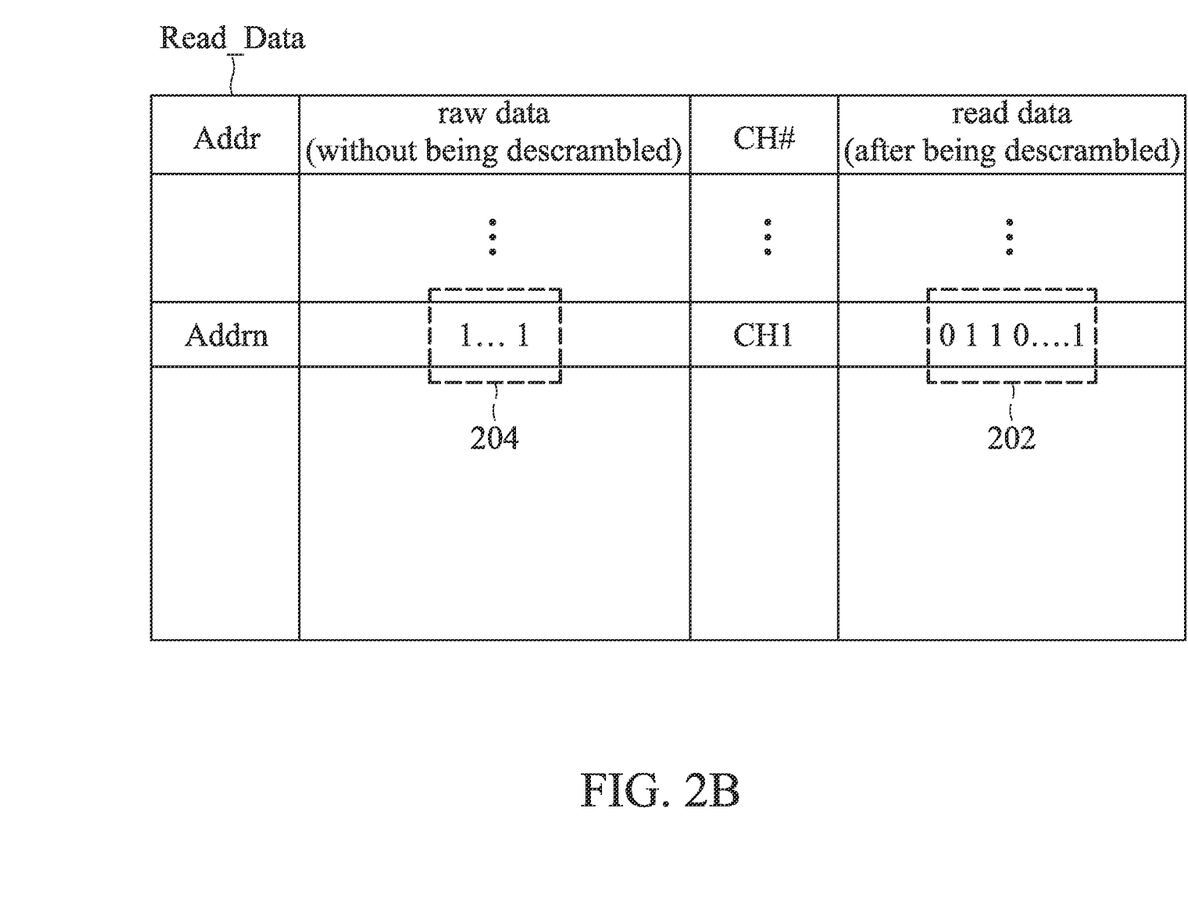
FIG. 2B illustrates the storage structure in the FIFIO buffer Read_FIFO in accordance with another exemplary embodiment of the present invention.
Figure 2C:
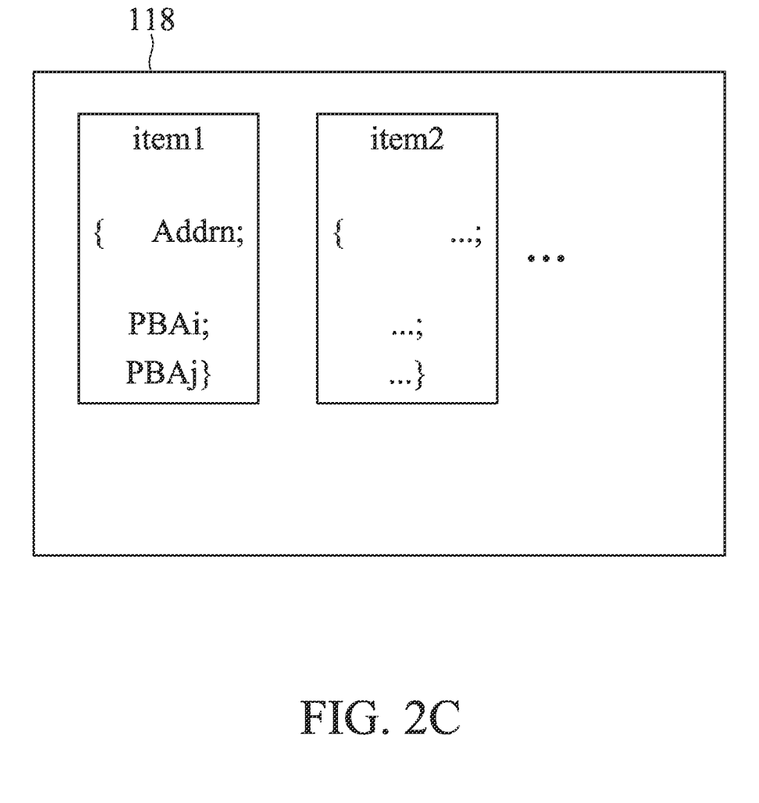
FIG. 2C illustrates a deterioration data structure 118 in accordance with an exemplary embodiment of the present invention.

FIG. 2A illustrates the storage structure in the FIFIO buffer Read_FIFO in accordance with an exemplary embodiment of the present invention. Each entry in the FIFIO buffer Read_FIFO stores a physical addresses PBA (represented by a channel number CH#, a chip enable signal number CE#, a block number Blk#, and a page number Page#). FIG. 2B illustrates the storage structure in the FIFIO buffer Read_FIFO in accordance with another exemplary embodiment of the present invention. At each address of the RAM 108, the stored content includes the raw data without descrambling, the read data after descrambling, and the channel number CH# of raw data. FIG. 2C illustrates a deterioration data structure 118 in accordance with an exemplary embodiment of the present invention. Each item (item1, item2, . . . ) corresponds to a deterioration event. For example, if multiple channels are detected having a page being deteriorated to the all-1's or all-0's data, multiple deterioration events should be recorded in the deterioration data structure 118.

Referring to FIG. 2B, when the error checking and correction that the error checking and correction module 116 performed on a read data 202 (temporarily stored at a temporary RAM address Addrn in the random access memory 108) fails, the error checking and correction module 116 further checks the raw data 204 that has not been descrambled to the read data 202. If the raw data 204 is all-1's or all-0's data, the error checking and correction module 116 determines that deterioration has occurred in the corresponding channel CH1, and sets the register reg1 (referring to FIG. 1) to assert the deterioration flag of the channel CH1. In an exemplary embodiment, the temporary RAM address Addrn of the RAM 108 is loaded into the item item1 that is in the deterioration data structure (referring to FIG. 2C). In response to the deterioration flag asserted in the register reg1, the controller 106 reads all physical addresses PBAs related to the channel CH1 from the FIFO buffer Read_FIFO. As shown, in FIG. 2A, a physical address PBAi recorded in the FIFO entry FIFOi as well as a physical address PBAj recorded in the FIFO entry FIFOj relate to the channel CH1. The controller 106 loads the physical addresses PBAi and PBAj into the item item1 (that is in the deterioration data structure) as two physical address candidates. The physical address candidates point to the possible deteriorated pages. According to the physical address candidates PBAi and PBAj listed in the item item1, the controller 106 reads the flash memory 104. Note that the controller 106 reads the spare information area Spare of a page indicated by the physical address candidate PBAi and the spare information area Spare of a page indicated by the physical address candidate PBAj without reading the user data areas of the two pages. If the spare information area Spare at the physical address candidate PBAi has deteriorated to all-1's or all-0's content, the controller 106 reads the temporary storage area Read_Data (FIG. 2B) according to the temporary RAM address Addrn stored in the item item1 of the deterioration data structure 118, and thereby obtains the descrambled read data 202. The controller 106 changes the read data 202 to the specific data (e.g., 0x55 or 0xAA, or others) before moving it to a safe block. Any value that can be scrambled into a combination of "1" and "0" bits rather than the all-1's or all-0's content may be used as the specific data. In this manner, the undesirable all-1's or all-0's data is not repeatedly duplicated throughout the whole flash memory 104. In particular, as long as the controller 106 reads the specific data, it can be determined that the read page has deteriorated and is unreliable.

Figure 3:
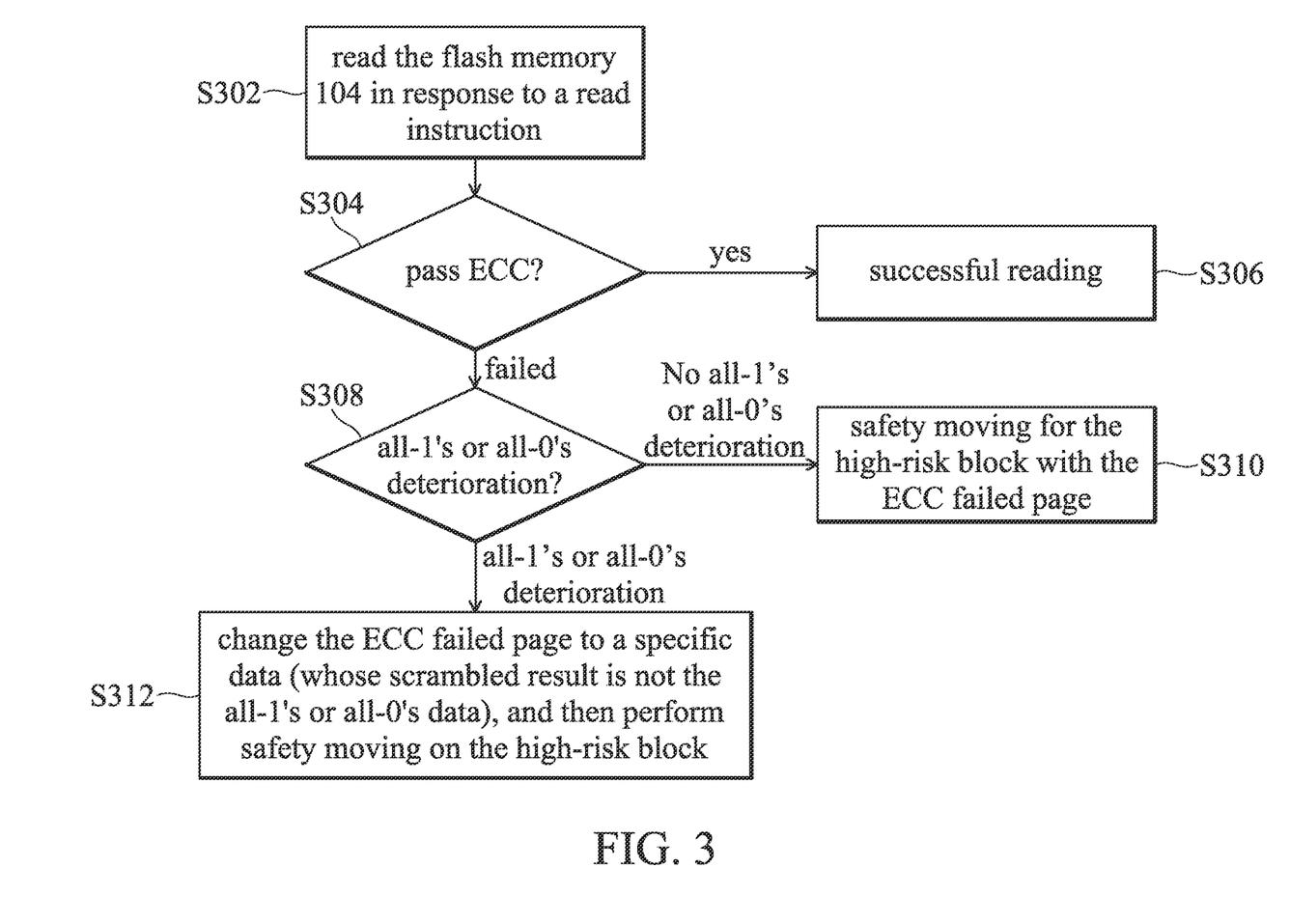
FIG. 3 is a flowchart of a read error solution in accordance with an exemplary embodiment of the present invention.

FIG. 3 is a flowchart of a read error solution in accordance with an exemplary embodiment of the present invention. In step S302, the flash memory 104 is read in response to a read instruction. In step S304, error checking and correction (e.g., ECC) is performed on the read data. If the error checking and correction succeeds, the procedure proceeds to step S306, and it is determined that the reading is successful. If the error checking and correction fails (for example, the rereading with modified parameters still fails the ECC procedure), the procedure proceeds to step S308 to check the all-1's or all-0's deterioration. If no all-1's or all-0's deterioration occurs, the procedure proceeds to step S310. In step S310, the content in the high-risk block with the ECC failed page is moved for safety. On the other hand, if all-1's or all-0's deterioration is detected, the procedure proceeds to step S312. In step S312, the page deteriorated to all-1's or all-0's data is changed to a specific data (whose scrambled result is not the all-1's or all-0's data) before being moved from the high-risk block to a safe block. In the future, in response to a read request that asks to read the flash memory 104 to get the data in the logical address that has suffered deterioration, the flash memory 104 returns the specific data. The controller 106, therefore, determines that the data that it requested to read has deteriorated, and notifies the host 110 that the read data is unreliable.

The following paragraphs discuss the use of the deterioration table Damage_TAB in detail.

Figure 4:
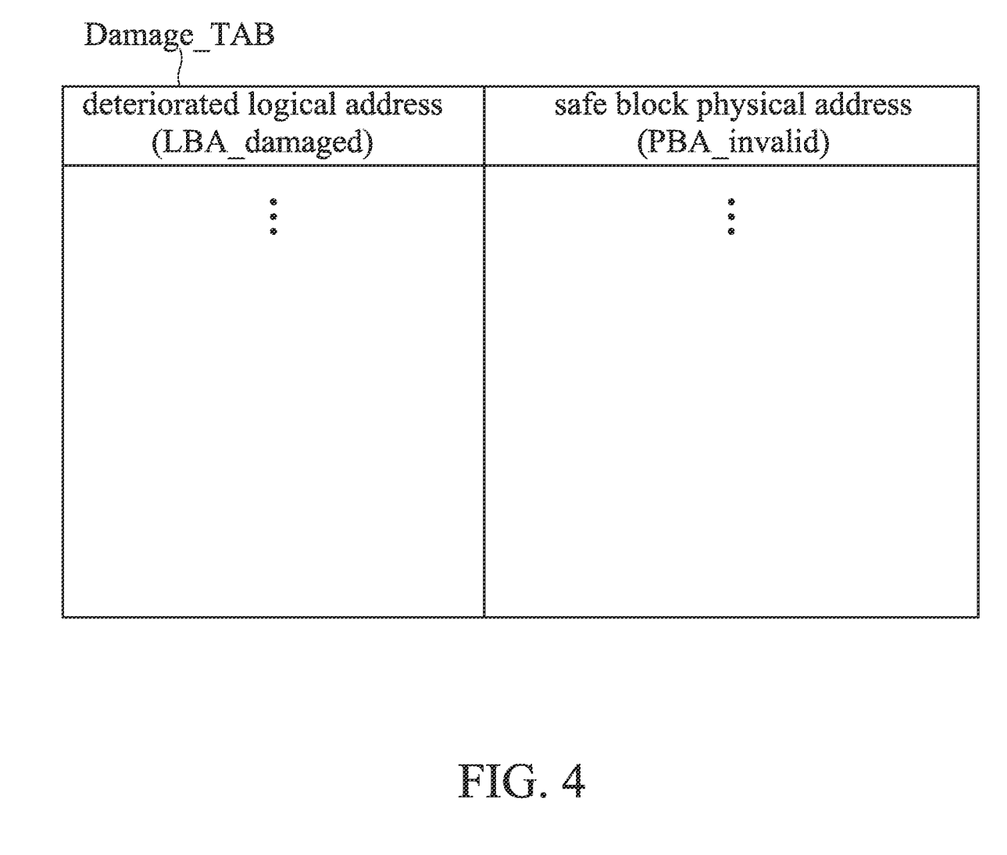
FIG. 4 illustrates an exemplary embodiment of the deterioration table Damage_TAB, which shows a record of deteriorated logical address LBA_damaged.

FIG. 4 illustrates an exemplary embodiment of the deterioration table Damage_TAB, which shows a record of deteriorated logical address LBA_damaged. The deterioration table Damage_TAB may further record a physical address PBA_invalid corresponding to each deteriorated logical address LBA_damaged. The physical address PBA_invalid shows where the data indicated by the deteriorated logical address LBA_damaged is if the data has been moved from the high-risk block to the safe block. The physical address PBA_invalid indicates the safe block.

Figure 5:
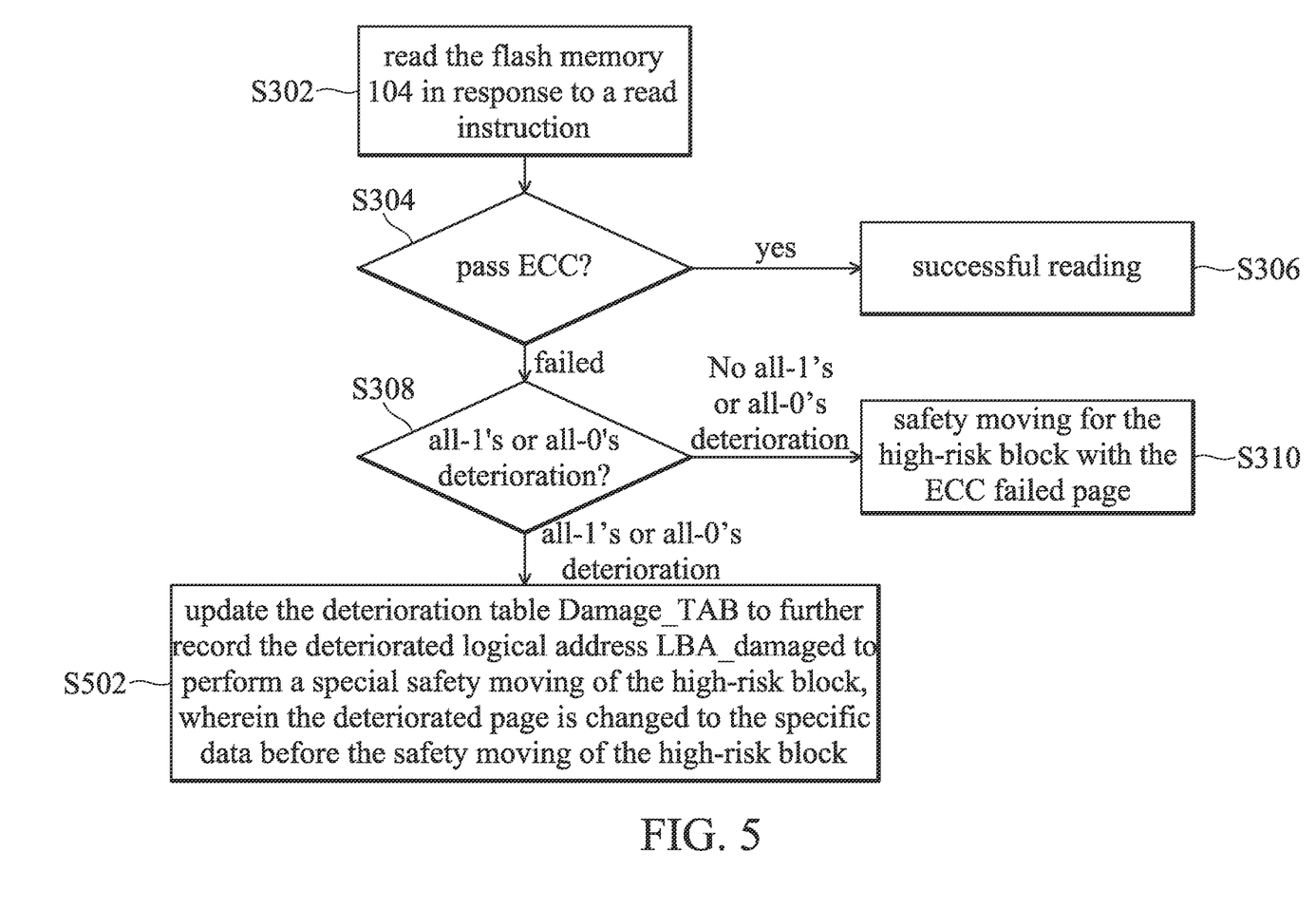
FIG. 5 is a flowchart of a read error solution based on the deterioration table Damage_TAB in accordance with an exemplary embodiment of the present invention.

FIG. 5 is a flowchart of a read error solution based on the deterioration table Damage_TAB in accordance with an exemplary embodiment of the present invention. In FIG. 5, when it is determined in step S304 that the read data temporarily stored in the temporary storage area Read_Data fails the error checking and correction and is determined in step S308 that the read data has deteriorated, the procedure proceeds to step S502. In step S502, the deterioration table Damage_TAB on the random access memory 108 is updated to further record the deteriorated logical address LBA_damaged for a special safety moving of the high-risk block. Referring to step S502, the deteriorated page is changed to the specific data and then is moved to a safe block in the safety moving of the high-risk block. In an exemplary embodiment, step S502 further uses the deterioration table Damage_TAB (referring to FIG. 4) to record the physical address PBA_invalid (in the safe block) associated with the deteriorated logical address LBA_damaged. When there is no task to do, the controller 106 obtains the block number of the safe block according to the physical address PBA_invalid recorded in the deterioration table Damage_TAB, and performs garbage collection on the safe block. During the garbage collection, the page with deterioration which has been changed to the specific data is regarded as invalid and not collected to the destination block. Because the unreliable page is not collected to the destination block, the flash memory 104 has better space utilization.

Figure 6:
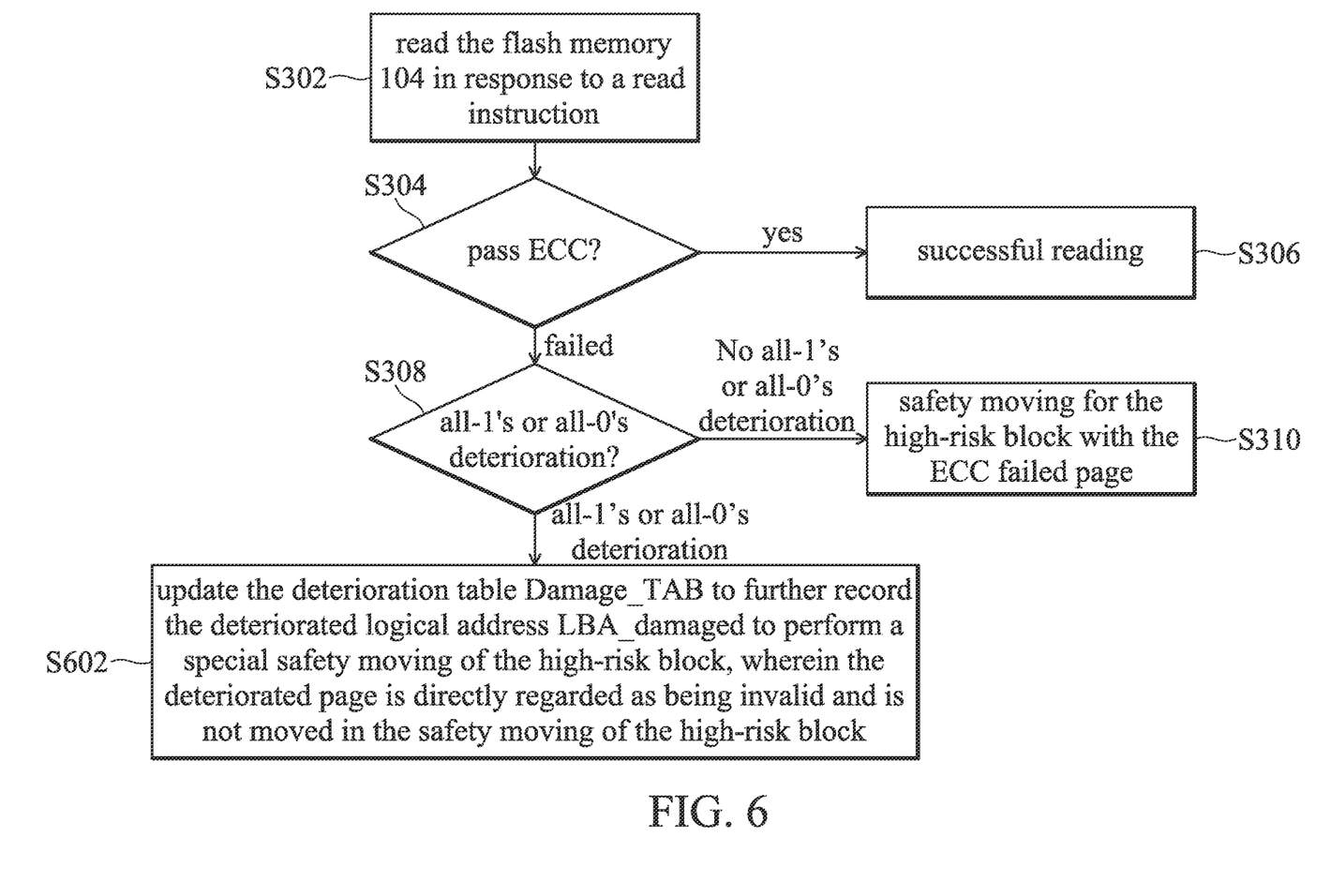
FIG. 6 is a flowchart illustrating a read error solution that directly invalidate the deteriorated pages (without moving it).

In another exemplary embodiment, the deterioration table Damage_TAB does not need to record the aforementioned physical address PBA_invalid. Instead, the deteriorated page is directly regarded as being invalid during the safety moving of the high-risk block, and is not moved to the safe block. FIG. 6 is a flowchart illustrating a read error solution that directly invalidates the deteriorated pages (without moving them). In FIG. 6, when it is determined in step S304 that the read data temporarily stored in the temporary storage area Read_Data fails the error checking and correction and it is determined in step S308 that the read data has deteriorated, the procedure proceeds to step S602. In step S602, the deterioration table Damage_TAB on the random access memory 108 is updated to further record the deteriorated logical address LBA_damaged for a special safety moving of the high-risk block. Different from the procedure of FIG. 5, according to the procedure of FIG. 6, the deteriorated page is not changed to the specific data. In fact, the deteriorated page is directly regarded as being invalid and is not moved to the safe block in the safety moving of the high-risk block. The flash memory 104 has better space utilization.

In another exemplary embodiment, the garbage collection on the safe block that contains the changed version of the deterioration data is triggered by the other events. No matter what event triggers the garbage collection, the controller 106 looks up the deterioration table Damage_TAB when performing garbage collection on the safe block. From the deterioration table Damage_TAB, the controller 106 gets the deteriorated logical address LBA_damaged, and directly invalidates the data of the deteriorated logical address LBA_damaged on the safe block without collecting the deteriorated page to the destination block of garbage collection.

The controller 106 may periodically program the deterioration table Damage_TAB back to the flash memory 104 for non-volatile storage. When the host 110 issues a read request, the controller 106 loads the deterioration table Damage_TAB from the flash memory 104 into the random access memory 108 to check whether the logical address LBA specified by the host 110 to read is a deteriorated logical address listed in the deterioration table Damage_TAB. If so, the controller 106 answers the host 110 that the data of the logical address LBA has deteriorated, is unreliable. No content can be used to answer the read request.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, coupled to the non-volatile memory,
wherein:
when determining that raw data read from the non-volatile memory is undesirable data, the controller performs safety moving of valid data of an erasure unit that contains the raw data to safely move the valid data of the erasure unit, wherein the raw data in the non-volatile memory is regarded as being in a deteriorated physical address, and
prior to being moved in the safety moving, the raw data is changed so that it is different from the undesirable data;
the controller accesses the non-volatile memory through a plurality of channels;
the controller provides a plurality of registers correspond one-to-one with the channels; and
when determining that the raw data read from the volatile memory is the undesirable data, the controller programs a register corresponding to a channel reading the undesirable data to flag the channel as a flagged channel.

2. The data storage device as claimed in claim 1, wherein:
the undesirable data is all-1's data or all-0's data.

3. The data storage device as claimed in claim 1, wherein:
the controller comprises a scrambling and descrambling module, which performs data scrambling before writing data into the non-volatile memory, and performs data descrambling after reading data from the non-volatile memory;
the controller operates the scrambling and descrambling module to descramble the raw data to obtain a read data, and performs error checking and correction on the read data; and
when the read data fails the error checking and correction, the controller determines whether the raw data without data descrambling is the undesirable data.

4. The data storage device as claimed in claim 3, further comprising:
a random access memory, temporarily storing the read data;
wherein:
in the random access memory, the controller changes the read data to a specific data; and
the controller reads the specific data from the random access memory, operates the scrambling and descrambling module to scramble the specific data to a scrambled result that is different from the undesirable data, and moves the scrambled result, rather than the undesirable data, for safety moving.

5. The data storage device as claimed in claim 1, wherein:
the controller plans a random access memory to provide a first-in-first-out buffer to buffer physical addresses of the non-volatile memory that a host requests to read, wherein each physical address includes channel information;

the controller checks the first-in-first-out buffer to get physical address candidates corresponding to the flagged channel; and according to the physical address candidates, the controller reads the non-volatile memory to determine the deteriorated physical address of the raw data that is the undesirable data.

6. The data storage device as claimed in claim 5, wherein:

according to each physical address candidate, the controller reads a spare information area of the non-volatile memory; and when reading all-1's bits or all-0's bits from a spare information area, the controller determines that the corresponding physical address candidate is the deteriorated physical address.

7. The data storage device as claimed in claim 5, wherein:

the controller reads the non-volatile memory according to each physical address candidate without reading a user data area indicated by each physical address candidate.

8. The data storage device as claimed in claim 5, wherein:

the controller builds a deterioration data structure in the random access memory, and uses an item in the deterioration data structure to store the physical address candidates as well as a temporary storage address in which the random access memory stores read data read and descrambled from the non-volatile memory;

the controller obtains the physical address candidates from the item in the deterioration data structure to read the non-volatile memory for determination of the deteriorated physical address;

after determining the deteriorated physical address, the controller obtains the temporary storage address from the item in the deterioration data structure; and in the temporary storage address of the random access memory, the controller changes the read data to specific data to be scrambled as a scrambled result that is different from the undesirable data, wherein the scrambled result replaces the undesirable data in the safety moving.

9. The data storage device as claimed in claim 4, wherein:

when the specific data is read, the controller determines that deterioration has occurred.

10. A control method for a non-volatile memory, comprising:

performing safety moving of valid data of an erasure unit that contains raw data that is read from the non-volatile memory and determined as undesirable data, to safely move the valid data of the erasure unit, wherein the raw data in the non-volatile memory is regarded as being in a deteriorated physical address;

prior to moving the raw data in the safety moving, changing the raw data so that it is different from the undesirable data;

accessing the non-volatile memory through a plurality of channels;

providing a plurality of registers correspond one-to-one with the channels; and when determining that the raw data is the undesirable data, programming a register corresponding to a channel reading the undesirable data to flag the channel as a flagged channel.

11. The control method as claimed in claim 10, wherein:
the undesirable data is all-1's data or all-0's data.

12. The control method as claimed in claim 10, further comprising:

descrambling the raw data to obtain a read data;

performing error checking and correction on the read data; and when the read data fails the error checking and correction, determining whether the raw data without data descrambling is the undesirable data.

13. The control method as claimed in claim 12, further comprising:

temporarily storing the read data in a random access memory;

in the random access memory, changing the read data to a specific data; and reading the specific data from the random access memory, scrambling the specific data to a scrambled result that is different from the undesirable data, and moving the scrambled result, rather than the undesirable data, for safety moving.

14. The control method as claimed in claim 10, further comprising:

providing a first-in-first-out buffer in a random access memory to buffer physical addresses of the non-volatile memory that a host requests to read, wherein each physical address includes channel information;

checking the first-in-first-out buffer to get physical address candidates corresponding to the flagged channel; and according to the physical address candidates, reading the non-volatile memory to determine the deteriorated physical address of the raw data that is the undesirable data.

15. The control method as claimed in claim 14, further comprising:

according to each physical address candidate, reading a spare information area of the non-volatile memory; and when reading all-1's bits or all-0's bits from a spare information area, determining that the corresponding physical address candidate is the deteriorated physical address.

16. The control method as claimed in claim 14, further comprising:

reading the non-volatile memory according to each physical address candidate without reading a user data area indicated by each physical address candidate.

17. The control method as claimed in claim 14, further comprising:

building a deterioration data structure in the random access memory, and using an item in the deterioration data structure to store the physical address candidates as well as a temporary storage address in which the random access memory stores read data read and descrambled from the non-volatile memory;

obtaining the physical address candidates from the item in the deterioration data structure to read the non-volatile memory for determination of the deteriorated physical address;

after determining the deteriorated physical address, obtaining the temporary storage address from the item in the deterioration data structure; and in the temporary storage address of the random access memory, changing the read data to specific data to be scrambled as a scrambled result that is different from the undesirable data, wherein the scrambled result replaces the undesirable data in the safety moving.

18. The control method as claimed in claim 13, further comprising:
    when reading the specific data, determining that deterioration has occurred.

* * * * *